No. 794,383. PATENTED JULY 11, 1905.
H. A. UTLEY.
IRONING MACHINE.
APPLICATION FILED AUG. 27, 1903.
4 SHEETS—SHEET 3.
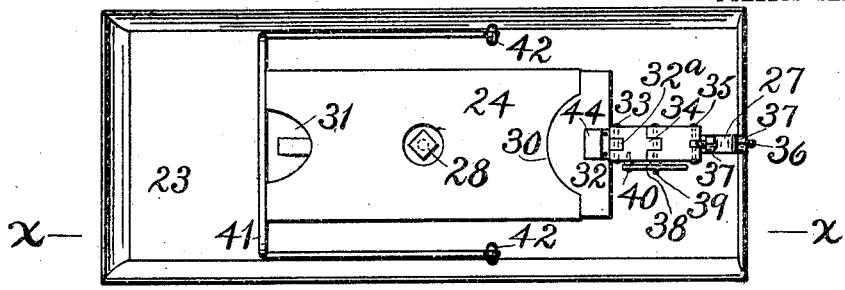
Fig. 3.
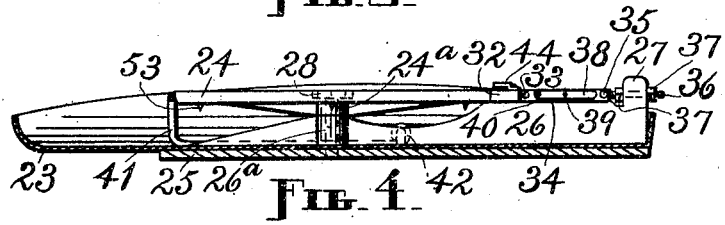
Fig. 4.
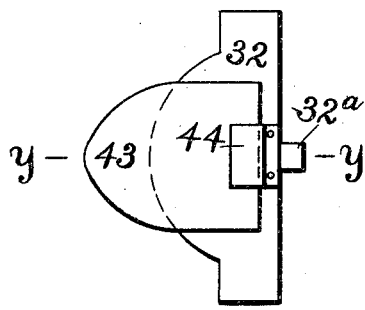
Fig. 5.
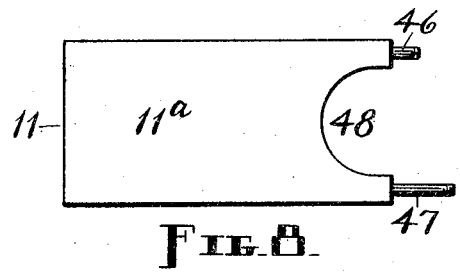
Fig. 8.
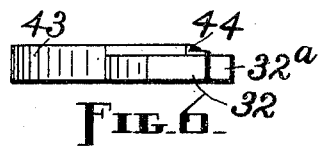
Fig. 6.
Fig. 9.
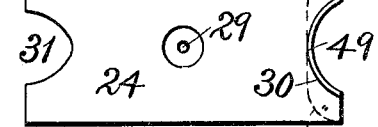
Fig. 7.
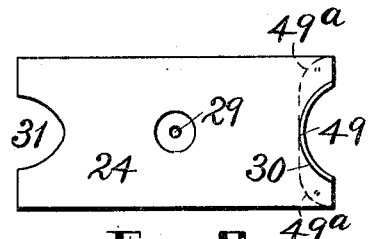
Fig. 10.
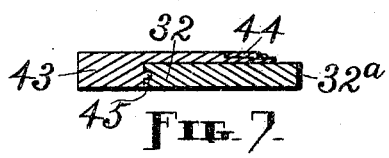
Fig. 11.
Witnesses
Inventor
Henry A. Utley.
By Webster, Taft & Tilley,
Attorneys No. 794,383. PATENTED JULY 11, 1905.
H. A. UTLEY.
IRONING MACHINE.
APPLICATION FILED AUG. 27, 1903.

4 SHEETS—SHEET 4.

Witnesses
F. A. Cutter.
A. L. Stevens.

Inventor
Henry A. Utley,
By Webster, Taft & Tilly.
Attorneys

No. 794,383. Patented July 11, 1905.

UNITED STATES PATENT OFFICE.

HENRY A. UTLEY, OF AMHERST, MASSACHUSETTS, ASSIGNOR TO DUDLEY H. KENDRICK, OF AMHERST, MASSACHUSETTS.

IRONING-MACHINE.

SPECIFICATION forming part of Letters Patent No. 794,383, dated July 11, 1905.

Application filed August 27, 1903. Serial No. 170,972.

*To all whom it may concern:*

Be it known that I, HENRY A. UTLEY, a citizen of the United States, residing at Amherst, in the county of Hampshire and Commonwealth of Massachusetts, have invented certain new and useful Improvements in Ironing-Machines, of which the following is a specification.

My invention relates to improvements in machines for ironing garments, but more particularly the bosoms of shirts, in which a peculiarly-constructed support for a shirt-bosom, holding devices for the shirt, a specially-constructed iron, with other novel features, are employed, as hereinafter set forth; and the objects of my improvement are, first, to provide means to greatly facilitate and expedite the work of ironing shirt-bosoms or shirt-bosoms and neckbands together; second, to provide simple, convenient, and forcible means for retaining the shirt-bosom in place while being ironed; third, to provide means for ironing bosoms of shirts having different styles of neckbands; fourth, to furnish a comparatively inexpensive iron having a working surface possessing great heat-retaining properties, and, fifth, to provide a machine and mechanism for obtaining the desired results in an efficient, practicable, and economical manner. I attain these objects by the means illustrated in the accompanying drawings, in which—

Figure 1:
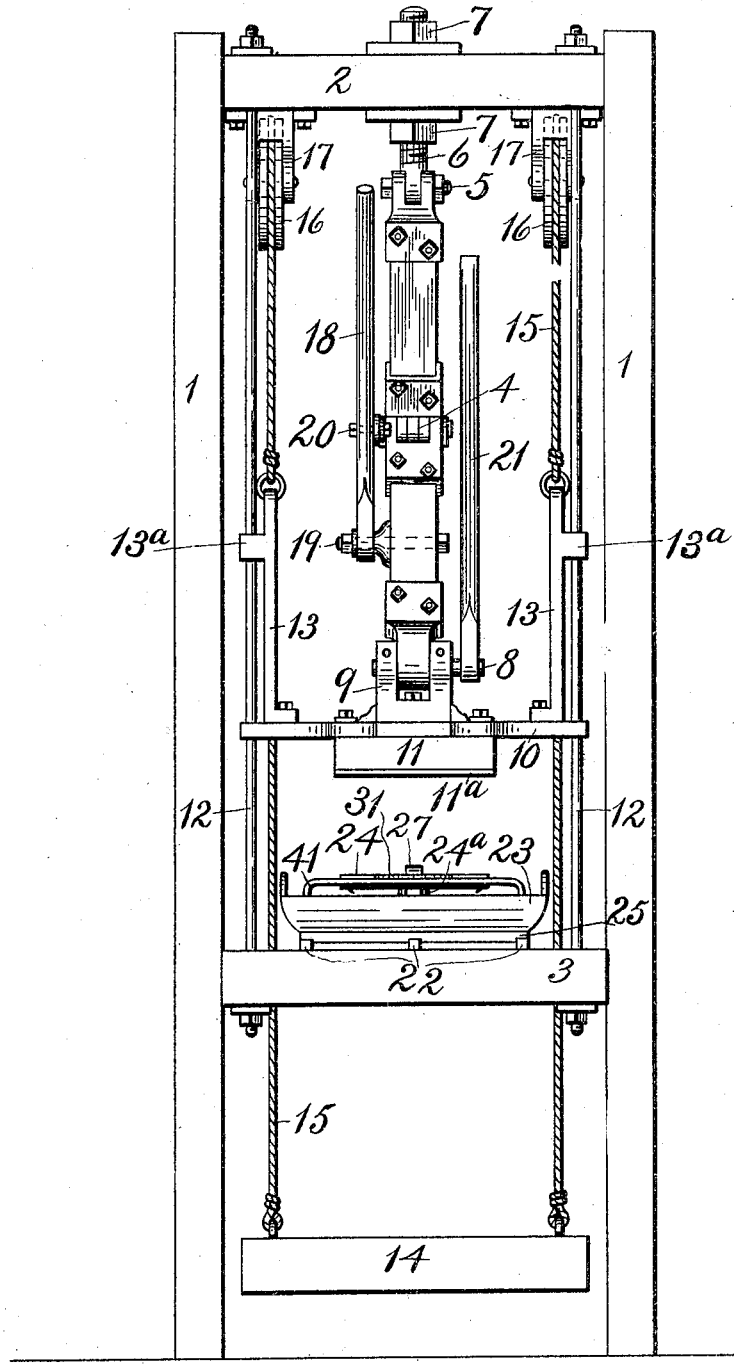
Figure 2:
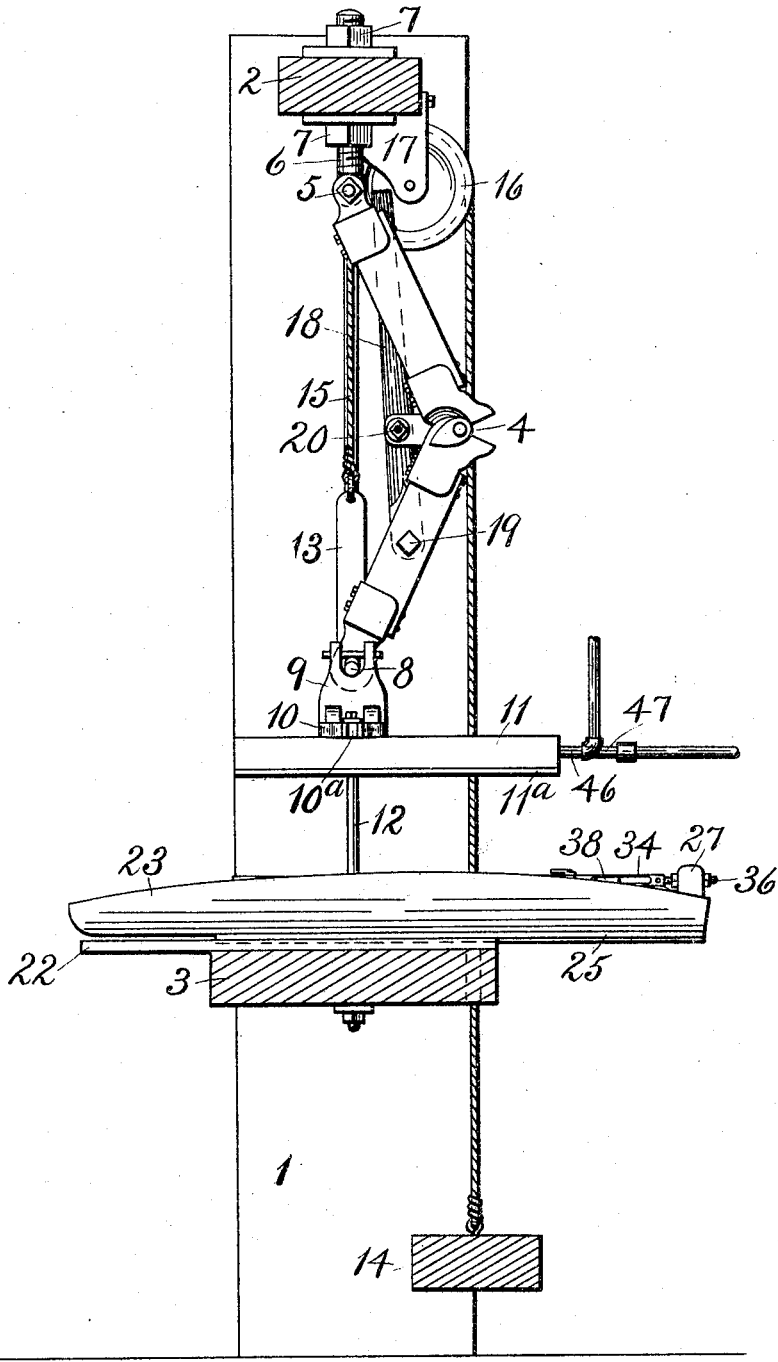
Figure 12:
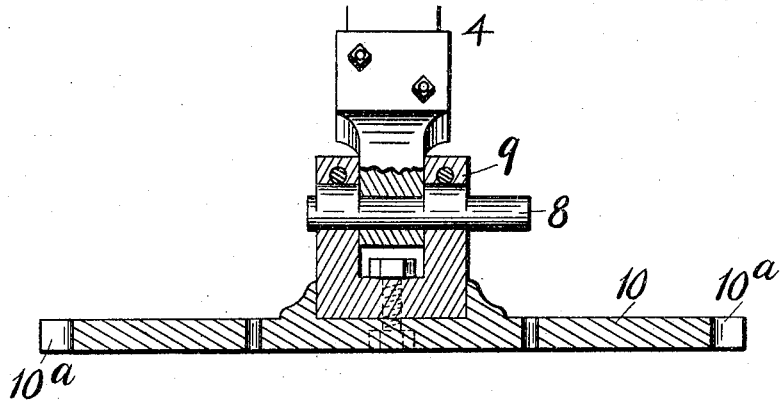
Figure 13:
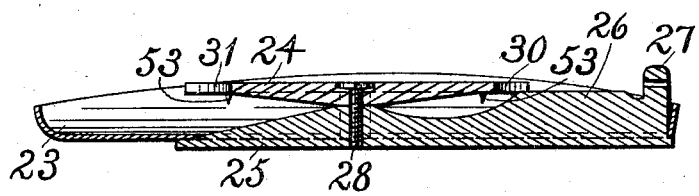
Figure 14:
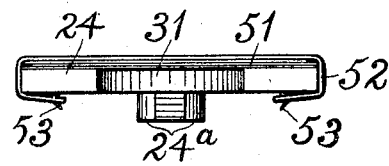

Figure 1 is a front view of a machine embodying my invention; Fig. 2, a partial section taken vertically through said machine, showing a side elevation of the larger portion of the working parts; Fig. 3, a plan view of the shirt-receptacle and the devices contained therein; Fig. 4, a longitudinal section on line $x$ $x$, Fig. 3, showing a side elevation of the bosom-support and neckband-holder; Fig. 5, an enlarged plan view of the neckband crosshead and a block having a heart-shaped neckband attached thereto; Fig. 6, a side view of the same; Fig. 7, a longitudinal section on line $y$ $y$, Fig. 5; Fig. 8, a bottom view of the iron; Fig. 9, a plan view of the bosom-support having an auxiliary rim for a stand-up neckband attached thereto; Fig. 10, a longitudinal section through the iron and bosom-support accompanied with the auxiliary rim, showing the parts in juxtaposition; Fig. 11, a bottom view of the aforesaid rim detached; Fig. 12, an enlarged sectional detail of the connection between the knuckle-joint and the platform which supports the iron; Fig. 13, a longitudinal central section through the receptacle and appurtenances, including the bosom-support; and Fig. 14, an enlarged end view of the bosom-board, showing how the yielding bed is held in place.

Similar characters of reference designate similar parts throughout the several views.

I am aware that so much of the machine as is employed to supply the pressure to the shirt-bosom, with the exception of the iron, has been used before in the art of hat-making, and I do not seek to claim the same broadly. This I will proceed first to describe.

A substantial frame is provided comprising side uprights 1 1, a cross-piece 2 at the top, and a second cross-piece serving as a table 3, located a convenient distance above the floor. In the center of this frame is a knuckle-joint 4, pivoted at 5 to a bolt 6, adjustably held to the cross-piece 2 by nuts 7 7. A cam-spindle 8 connects the base of the knuckle-joint with a lug 9, to the bottom of which a platform 10 is securely attached. An iron 11 is secured to the bottom of the platform 10. Vertical guide-rods 12 12, one each side of the knuckle-joint mechanism, are bolted at the top and bottom to the cross-piece 2 and table 3, respectively, and each end of the platform 10 is bifurcated, as shown at $10^a$ in Fig. 2, so as to engage the corresponding rod 12. As a further means of guiding the platform 10, to which the iron 11 is attached, and steadying the same in its up-and-down movement guides 13 13 are bolted to the top of said platform and provided with lugs $13^a$ $13^a$, which are also bifurcated to engage the rods 12 in the same manner as the ends of the platform 10. The mechanism thus far described is counterbalanced by means of a counterweight 14 through the medium of ropes 15 15 passing upward from said counterweight over pulleys 16 16 to the guides 13, said pulleys being journaled in suitable brackets 17, 17, supported by the cross-piece 2.

The knuckle-joint 4 is operated to raise or lower the iron 11 by means of a lever 18, having its base pivoted at 19 to the lower member of the knuckle-joint and pivoted at 20 to the connection between the two members which make up the knuckle-joint. When the lever 18 is actuated forward, the knuckle-joint is straightened and the iron depressed, and when said lever is forced backward the iron is elevated, in which position it is shown in Figs. 1 and 2. Additional movement to the iron is secured by the cam-spindle 8, which is rotated by a lever 21. The drawing forward of the lever 21 depresses the iron below the position in which the knuckle-joint left it when the same was straightened, and a reverse movement of said lever releases the iron. The parts are so adjusted that the counterweight 14 holds the iron stationary when raised, wherever it may be left.

Three horizontal tracks 22, more or less, are fastened to the top of the table 3, and a shirt-receptacle 23 is mounted on said tracks and may be moved back and forth thereon. A bosom-support 24 is mounted in the receptacle 23, and the knuckle-joint is so adjusted, by means of the nuts 7, that when straightened the iron 11 is brought down onto said support with considerable pressure, which is increased by means of the cam-spindle 8, as before explained. The receptacle 23 preferably consists of a sheet-metal pan mounted on a cast-iron bottom plate 25, which is grooved to receive the tracks 22. A central ridge 26 rises from the center of the bottom of the receptacle 23, having at one end a post or upright 27, said ridge extending longitudinally in the receptacle. The support 24 is provided on the bottom with a central boss $24^a$, which rests upon a corresponding boss or enlargement $26^a$ on the ridge 26, and said support is held in place by a bolt 28, passing through a hole 29 into threaded engagement with the sides of a corresponding opening in said enlargement $26^a$. The head of the bolt 28 is received into a counterbore in the top of the support 24, so as not to project above the upper surface thereof. By loosening this bolt the support can be turned end for end.

The support is cut out at one end for the ordinary shape of neckband, as shown at 30, and at the other end for the so-called "heart-shaped" neckband, as shown at 31.

In ironing shirt-bosoms it is necessary to securely and firmly hold the neckband and shoulders in place at one end and the front flap at the other of the support. To this end I have provided a cross-head operated by an adjustable knuckle-joint for the neckband and shoulders and a bail for the flap, which I will next proceed to describe.

The cross-head 32 consists of a curved front projection adapted to fit into the cut or recess 30 in the support 24 and laterally-extending arms for engagement with the edges of said support both sides of said recess. The cross-head 32 normally rests upon the ridge 26 and has a rearwardly-extending lug $32^a$, which is pivoted at 33 to the forward end of a knuckle-joint 34. The rear end of the knuckle-joint 34 is pivoted at 35 to a bolt 36, which passes through the upright 27 and is adjustably held thereto by nuts 37 37. The tightness of the fit between the support 24 and the cross-head 32 is increased or decreased by loosening the nuts 37, adjusting the bolt 36, and reseating the nuts. A lever 38 on the knuckle-joint pivot 39 and having its forward end pivoted at 40 to the front member of the knuckle-joint is employed for operating the latter to move the cross-head toward or away from the support. The knuckle-joint is shown extended in the drawings with the cross-head in conjunction with the support; but by elevating the lever 38 said knuckle-joint is contracted or shortened and said cross-head consequently withdrawn from contact with the support. A bail 41, having its ends pivotally attached to staples 42 42 in the receptacle 23, consists in part of a portion which preferably occupies a different plane from that of another portion extending crosswise of said receptacle and adapted to be brought down tightly against that end of the support 24 which is opposite the cross-head 32. The bail 41 is preferably made of wire which is more or less resilient.

When a shirt is to be placed in position with its bosom upon the support 24, the cross-head 32 is drawn back sufficiently to allow the neckband to be turned down into the recess 30 and the folded edges of the shoulder portions of the shirt to be turned over the straight edge portions of the support, where they are held firmly by said cross-head, which is now forced against the same. Next the bail 41, which meanwhile has been turned over out of the way, is restored to normal position and drawn down over the front end of the support and the front flap of the shirt to hold the same securely in place. This last operation not only secures the flap, but keeps the bosom taut. A valuable feature of this means for holding the flap resides in the fact that while it secures the garment with a sufficient degree of force it also permits of the straightening of the bosom, if necessary, by pulling upon any required portion of the loose part of the flap which hangs below the bail.

In order to secure or attach a heart-shaped neckband to the support 24, which latter must be reversed for the purpose from the position shown in the drawings, I make use of a block 43, mounted on the cross-head 32. That portion of this block which extends beyond the curved part of the cross-head is adapted to fit closely into the recess 31. The block 43 may be secured to the cross-head by means of a clip 44, secured to the top of the cross-head, and, if necessary, a pin 45, projecting from the rear edge of that portion of the block which extends down over the front of the cross-head into the latter. The back part of the block 43 extends over the top of the cross-head beneath the clip 44 and is preferably recessed to receive said clip. This method of connection between the clip and block provides for a flush top surface and assists in properly positioning said block. With such a device a shorter knuckle-joint than that already described is required. Otherwise there is no change. In this case the projecting ends of the cross-head do not bind upon the shoulders of the shirt.

The iron 11 is hollow, and provision is made for heating the same with steam through the medium of the connections 46 and 47. In order to obtain a great amount of heat on the bottom surface of the iron, where it is required most, a comparatively thin plate $11^a$, of some composition, as spelter, which not only furnishes the requisite smooth surface, but is also a better heat-conductor than iron or steel, is attached to the under side of the iron. The back part of the iron is preferably cut away at 48, so that it will clear the block 43 when used or any other obstruction which may be present at that point. By providing the support 24 with an upstanding rim 49 and cutting away the iron, as just described, I am able to iron a shirt-bosom and the adjacent portions of the neckband all at the same time or in one operation. This rim is of sufficient height above the top of the support 24 to accommodate the neckband and may be attached to said support in any suitable manner, as by screws 50, which pass through horizontal lips $49^a$ $49^a$, extending from the base of said rim beneath the support into the latter.

In order to provide a yielding bed for the shirt-bosom which will also take up the moisture therein, I make use of one or more sheets of blotting-paper 51, laid upon the support, and one or more layers of felt 52 or other suitable textile material above the blotting-paper, the upper layer of felt being wide enough to extend over the long edges of the support and catch upon pins 53, set into the under side thereof. When the neckband is to be ironed with the shirt-bosom, the top layer of felt 52 should be turned up at the rear against the rim 49, as shown in Fig. 10.

In operation the receptacle 23 is drawn forward while the iron is elevated and the shirt-bosom secured upon the support in the manner already described, after which the receptacle is pushed beneath the iron and the latter depressed in two motions by means of the levers 18 and 21 and then elevated again, when the receptacle is once more withdrawn from beneath the iron to permit the ironed shirt to be removed and another one substituted therefor. The stroke of the iron is regulated by means of the nuts 7. If the neckband is to be ironed with the bosom, making use of the rim 49, the receptacle is pushed back far enough to enable the iron to be brought down in its first motion in front of said rim, occupying relative to the support the position substantially as shown in Fig. 10. Then the receptacle is drawn forward until said rim, which fits into the iron recess 48, forces the neckband tightly against the vertical sides of said recess, and the operation is completed in the second movement of the iron, after which the iron is raised to release the shirt and its supporting members. When the neckband is to be ironed, as above explained, the heat-conducting plate $11^a$ should extend upward into the recess 48 for a distance equal or greater than the height of the neckband.

When a shirt having a heart-shaped neckband is to be ironed, the support must be reversed and the block placed in position as hereinbefore explained. If the heart-shaped neckband is to be ironed with the bosom, of course a rim of similar shape and also an iron recessed to conform thereto are required. In this last case it will be better to have a separate machine, which is, however, similar to the first except so far as the neckband members are concerned.

Instead of carrying the top layer of felt over the long edges or sides of the support and fastening it to pins it may be made longer and so cut as to enable it to be drawn over the short edges or ends of said support and secured beneath the same.

It is obvious that various changes of minor importance which fall within the scope of my invention may be made without departing from the nature thereof.

What I claim as my invention, and desire to secure by Letters Patent, is—

1. The combination, in an ironing-machine, with a suitable support and means for securing a shirt thereto, of an iron, independent mechanical means for depressing said iron in two separate and distinct motions, and guide members at the sides of the iron adapted to insure vertical movement thereto.

2. The combination, in an ironing-machine, with suitable means for securing a shirt to a support, of an iron, knuckle-joint mechanism for raising or lowering said iron, and independent cam mechanism connecting the knuckle-joint mechanism with the iron for raising and lowering the same.

3. The combination, in an ironing-machine, with a suitable support and means for securing a shirt thereto, of an iron, knuckle-joint and cam mechanism for forcibly depressing said iron in two motions, means to adjust the stroke of the iron, and laterally-arranged sliding guides for the iron.

4. The combination, in an ironing-machine, with suitable means for securing a shirt to a support, of an iron, knuckle-joint mechanism for raising or lowering said iron, means for adjusting the height of said mechanism, and independent cam mechanism for raising and lowering the iron.

5. The combination, in an ironing-machine, with a recessed bosom-support, of a cross-head comprising a single member mounted to slide only forward and back in a given plane and to fit into the recess in said support and contact with the ends of the same or with interposed portions of a shirt, a post remote from said cross-head, and knuckle-joint mechanism between the latter and said post for operating the cross-head.

6. The combination, in an ironing-machine, with a recessed bosom-support, of a cross-head adapted to fit into the recess in said support, a post remote from the cross-head, knuckle-joint mechanism between the latter and said post for operating said cross-head, and means to adjust said mechanism toward or away from said support.

7. The combination, in an ironing-machine, with a reversible shirt-support having recesses of different shapes in its ends, of a post remote from said support, and means between the latter and said post to secure the neckband of a shirt in either of said recesses.

8. The combination with a recessed bosom-support, of securing means for the neckband of a shirt, comprising a reciprocating cross-head and a block adapted to be mounted thereon, the front portion of said block extending beyond and overlapping the front of said cross-head, with its front edge adjacent to or contiguous with the edge of the recess in said support, and a pin connection between contiguous edges of the cross-head and block.

9. The combination with a recessed bosom-support, of securing means for the neckband of a shirt, comprising a cross-head having a clip mounted thereon, and a block adapted to be mounted on said cross-head and engaged by said clip, the front portion of said block extending beyond and overlapping the front of the cross-head, with its front edge adjacent to or contiguous with the edge of the recess in said support.

10. The combination, in an ironing-machine, of a shirt-receptacle slidingly mounted on the table of the machine, a bosom-support mounted in said receptacle, and retaining means for the shirt at both ends of said support in the receptacle, such means comprising a horizontally-movable cross-head at one end and a knuckle-joint for actuating said cross-head, and a bent-wire bail at the other end, having its ends pivotally connected to the receptacle.

11. The combination, in an ironing-machine, of a shirt-receptacle slidingly mounted upon the machine-table, a ridge in said receptacle, a bosom-support mounted on said ridge, a horizontally-movable cross-head and a knuckle-joint therefor carried by said ridge for securing the neck of the shirt to said support, and an upright on the ridge to serve as a point of attachment for said knuckle-joint.

12. The combination, in an ironing-machine, of a shirt-receptacle slidingly mounted upon the machine-table, a ridge in said receptacle, a bosom-support mounted on said ridge, a horizontally-movable cross-head and a knuckle-joint therefor carried by said ridge for securing the neck of the shirt to said support, an upright on the latter to serve as a point of attachment for said knuckle-joint, and a swinging bail adapted to engage one end of the support and having its ends pivotally connected with the receptacle.

13. The combination, in an ironing-machine, of a shirt-receptacle slidingly mounted upon the table of the machine, a supporting-ridge in said receptacle, a reversible bosom-support mounted upon and attached to said ridge, and retaining means for the shirt, at both ends of said support in the receptacle, such means comprising a horizontally-movable cross-head at one end and a knuckle-joint for actuating said cross-head, and a bent-wire bail at the other end, having its ends pivotally connected to the receptacle.

14. The combination, in an ironing-machine, with a suitable support for a shirt, of a counterweighted iron, means at the sides of said iron to guide the same vertically, and knuckle-joint mechanism between the guide members for operating the iron.

15. The combination, in an ironing-machine, with a suitable support for a shirt, of a counterweighted iron, mechanism for operating the latter in two separate and distinct motions, guide-rods, and guides connected with said iron and in sliding engagement with said rods.

16. The combination, in an ironing-machine, with a suitable support for a shirt, of an iron, mechanism for operating the latter, guide-rods, guides connected with said iron and in sliding engagement with said rods, and a counterweight adapted to act upon the iron through the medium of said guides.

In testimony whereof I have signed my name to this specification in the presence of two subscribing witnesses.

HENRY A. UTLEY.

Witnesses:
F. A. CUTTER,
D. H. KENDRICK.